United States Patent
Kubo et al.

(10) Patent No.: US 12,413,802 B2
(45) Date of Patent: Sep. 9, 2025

(54) REPRODUCTION DEVICE, REPRODUCTION DEVICE CONTROL METHOD, AND RECORDING MEDIUM

(71) Applicant: Panasonic Intellectual Property Management Co., Ltd., Osaka (JP)

(72) Inventors: Shota Kubo, Osaka (JP); Hideki Fukuda, Nara (JP); Naoya Takao, Hyogo (JP); Shiro Iwasaki, Osaka (JP); Norimichi Kubo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 18/026,745

(22) PCT Filed: Sep. 14, 2021

(86) PCT No.: PCT/JP2021/033650
§ 371 (c)(1),
(2) Date: Mar. 16, 2023

(87) PCT Pub. No.: WO2022/065124
PCT Pub. Date: Mar. 31, 2022

(65) Prior Publication Data
US 2023/0345071 A1    Oct. 26, 2023

(30) Foreign Application Priority Data
Sep. 25, 2020    (JP) .................................. 2020-161479

(51) Int. Cl.
*H04N 21/41*    (2011.01)
*H04N 21/436*    (2011.01)

(52) U.S. Cl.
CPC . *H04N 21/41265* (2020.08); *H04N 21/43615* (2013.01)

(58) Field of Classification Search
CPC .................. H04N 21/43615; H04N 21/41265
See application file for complete search history.

(56) References Cited

U.S. PATENT DOCUMENTS 9,510,201 B1 *  11/2016  Shimoon ............... H04W 12/06
9,736,541 B1 *  8/2017   Nijim  ............... H04N 21/41265
(Continued)

FOREIGN PATENT DOCUMENTS

| | | | |
|---|---|---|---|
| EP | 3016438 B1 * | 4/2019 | ............. H04W 4/80 |
| JP | 2013-247539 A | 12/2013 | |
| JP | 2014-171192 A | 9/2014 | |

OTHER PUBLICATIONS

International Search Report issued on Nov. 30, 2021 in International Patent Application No. PCT/JP2021/033650, with English translation.

(Continued)

*Primary Examiner* — James R Sheleheda
(74) *Attorney, Agent, or Firm* — Rimon P.C.

(57) ABSTRACT

A reproduction device includes: an HDMI transmitter that detects a power state of a display device; a first communication module that establishes communication with a terminal device that is externally located, when the HDMI transmitter does not detect that the display device is in a power-on state; and a controller that performs first settings with the terminal device, when the communication is established between the terminal device and the first communication module, the first settings being settings relating to the reproduction device.

9 Claims, 13 Drawing Sheets

(56) References Cited

U.S. PATENT DOCUMENTS

| | | | | |
|---|---|---|---|---|
| 10,448,080 B1* | 10/2019 | Nijim | ........ | H04N 21/6131 |
| 2004/0117390 A1* | 6/2004 | Karaoguz | ........ | H04N 21/6582 |
| | | | | 348/E7.071 |
| 2005/0073518 A1* | 4/2005 | Bontempi | ........ | H04N 5/63 |
| | | | | 348/E5.127 |
| 2005/0144640 A1* | 6/2005 | Fritsch | ........ | H04N 21/47214 |
| | | | | 348/E7.071 |
| 2008/0098450 A1* | 4/2008 | Wu | ........ | H04N 21/4622 |
| | | | | 725/132 |
| 2008/0109734 A1* | 5/2008 | Castagno | ........ | H04N 21/8166 |
| | | | | 715/740 |
| 2009/0002568 A1* | 1/2009 | Konda | ........ | H04N 5/765 |
| | | | | 348/E5.057 |
| 2009/0135309 A1* | 5/2009 | DeGeorge | ........ | H04N 21/4345 |
| | | | | 348/732 |
| 2009/0165060 A1* | 6/2009 | Lawrence | ........ | H04N 21/42224 |
| | | | | 725/81 |
| 2009/0165075 A1* | 6/2009 | Rhodes | ........ | H04N 21/6143 |
| | | | | 725/153 |
| 2010/0070994 A1* | 3/2010 | Yun | ........ | H04N 21/6543 |
| | | | | 340/687 |
| 2010/0125890 A1* | 5/2010 | Levine | ........ | H04N 21/2393 |
| | | | | 725/151 |
| 2010/0265413 A1* | 10/2010 | Seo | ........ | H04N 21/42204 |
| | | | | 370/313 |
| 2011/0156879 A1* | 6/2011 | Matsushita | ........ | H04L 63/08 |
| | | | | 340/10.1 |
| 2011/0273625 A1* | 11/2011 | McMahon | ........ | H04N 21/4227 |
| | | | | 348/734 |
| 2011/0273627 A1* | 11/2011 | Tsuji | ........ | H04N 21/47 |
| | | | | 348/739 |
| 2013/0005250 A1* | 1/2013 | Kim | ........ | G08C 23/04 |
| | | | | 455/41.1 |
| 2013/0117442 A1* | 5/2013 | Mountain | ........ | H04N 21/454 |
| | | | | 709/224 |
| 2013/0176500 A1* | 7/2013 | Nagata | ........ | H04N 21/8586 |
| | | | | 348/723 |
| 2013/0279471 A1* | 10/2013 | Kito | ........ | H04W 36/08 |
| | | | | 370/331 |
| 2014/0079374 A1* | 3/2014 | Gehring | ........ | H04N 21/8586 |
| | | | | 725/38 |
| 2014/0173584 A1* | 6/2014 | Gayrard | ........ | H04L 63/062 |
| | | | | 717/173 |
| 2014/0310742 A1* | 10/2014 | Kim | ........ | H04N 21/485 |
| | | | | 725/110 |
| 2015/0074047 A1* | 3/2015 | Gardes | ........ | G06F 16/178 |
| | | | | 707/610 |
| 2015/0078362 A1* | 3/2015 | Kunieda | ........ | H04W 76/20 |
| | | | | 370/338 |
| 2015/0350773 A1* | 12/2015 | Yang | ........ | H04N 21/439 |
| | | | | 381/77 |
| 2015/0358760 A1* | 12/2015 | Kehm | ........ | H04W 8/005 |
| | | | | 455/41.3 |
| 2016/0044385 A1* | 2/2016 | Kareeson | ........ | H04N 21/658 |
| | | | | 725/27 |
| 2016/0080806 A1* | 3/2016 | Ozeki | ........ | H04H 60/32 |
| | | | | 725/14 |
| 2017/0255431 A1* | 9/2017 | Yu | ........ | H04N 21/4312 |
| 2017/0289638 A1 | 10/2017 | Mok | | |
| 2018/0067711 A1* | 3/2018 | Koga | ........ | G06F 3/1229 |
| 2018/0206122 A1* | 7/2018 | Bradley | ........ | G06F 21/604 |
| 2018/0324684 A1 | 11/2018 | Onohara et al. | | |
| 2019/0149871 A1* | 5/2019 | Yoshizawa | ........ | H04N 21/436 |
| | | | | 348/734 |
| 2019/0373320 A1* | 12/2019 | Balsamo | ........ | G06F 3/0485 |
| 2019/0394524 A1* | 12/2019 | Latini | ........ | H04N 21/4424 |
| 2020/0128289 A1* | 4/2020 | Machida | ........ | H04N 21/42225 |
| 2021/0219023 A1* | 7/2021 | Sheng | ........ | A61B 5/6801 |
| 2022/0303612 A1* | 9/2022 | Reddy | ........ | G10L 19/167 |
| 2023/0345071 A1* | 10/2023 | Kubo | ........ | H04N 21/41407 |

OTHER PUBLICATIONS

Extended European Search Report dated Mar. 7, 2024 issued in the corresponding European Patent Application No. 21872254.4.

* cited by examiner

REPRODUCTION DEVICE, REPRODUCTION DEVICE CONTROL METHOD, AND RECORDING MEDIUM

CROSS-REFERENCE OF RELATED APPLICATIONS

This application is the U.S. National Phase under 35 U.S.C. § 371 of International Patent Application No. PCT/JP2021/033650, filed on Sep. 14, 2021, which in turn claims the benefit of Japanese Patent Application No. 2020-161479, filed on Sep. 25, 2020, the entire disclosures of which Applications are incorporated by reference herein.

TECHNICAL FIELD

The present disclosure relates to a reproduction device, a reproduction device control method, and a recording medium.

Background Art

There is known a reproduction device that outputs a video signal onto a display device (see, for example, Patent Literature (PTL) 1). When a reproduction device of this kind is powered on for the first time after the purchase, initial settings for the reproduction device need to be performed. To perform the initial settings, an initial settings screen outputted from the reproduction device is displayed on a display device, with the reproduction device and the display device interconnected via a cable. The user operates a remote control of the reproduction device to perform the initial settings for the reproduction device on the initial settings screen displayed on the display device.

CITATION LIST

Patent Literature

[PTL 1] Japanese Unexamined Patent Application Publication No. 2014-171192

SUMMARY OF INVENTION

Technical Problem

The present disclosure provides a reproduction device, a reproduction device control method, and a recording medium that enable predetermined settings to be performed without using a display device.

Solution to Problem

The reproduction device in the present disclosure is a reproduction device that is connectable to a display device and outputs a video signal to the display device. The reproduction device includes: a detector that detects a power state of the display device; a first communicator that establishes communication with a terminal device that is externally located, when the detector does not detect that the display device is in a power-on state; and a controller that performs first settings with the terminal device, when the communication is established between the terminal device and the first communicator, the first settings being settings relating to the reproduction device.

Advantageous Effects of Invention

The reproduction device and so forth in the present disclosure enable predetermined settings to be performed without using a display device.

DESCRIPTION OF EMBODIMENT

The following describes in detail the embodiment with reference to the drawings where appropriate. Note, however, that detailed description more than necessary may be omitted. For example, detailed description of a well-known matter or repetitive description of substantially the same configuration may be omitted. This is to prevent the following description from becoming unnecessarily redundant and to facilitate the understanding of those skilled in the art.

Also note that the inventors provide the accompanying drawings and the following description for those skilled in the art to fully understand the present disclosure, and thus that these do not intend to limit the subject recited in the claims.

Embodiment

With reference FIG. 1 thorough FIG. 14, an embodiment will be described.

[1-1. System Overview]

Figure 1:
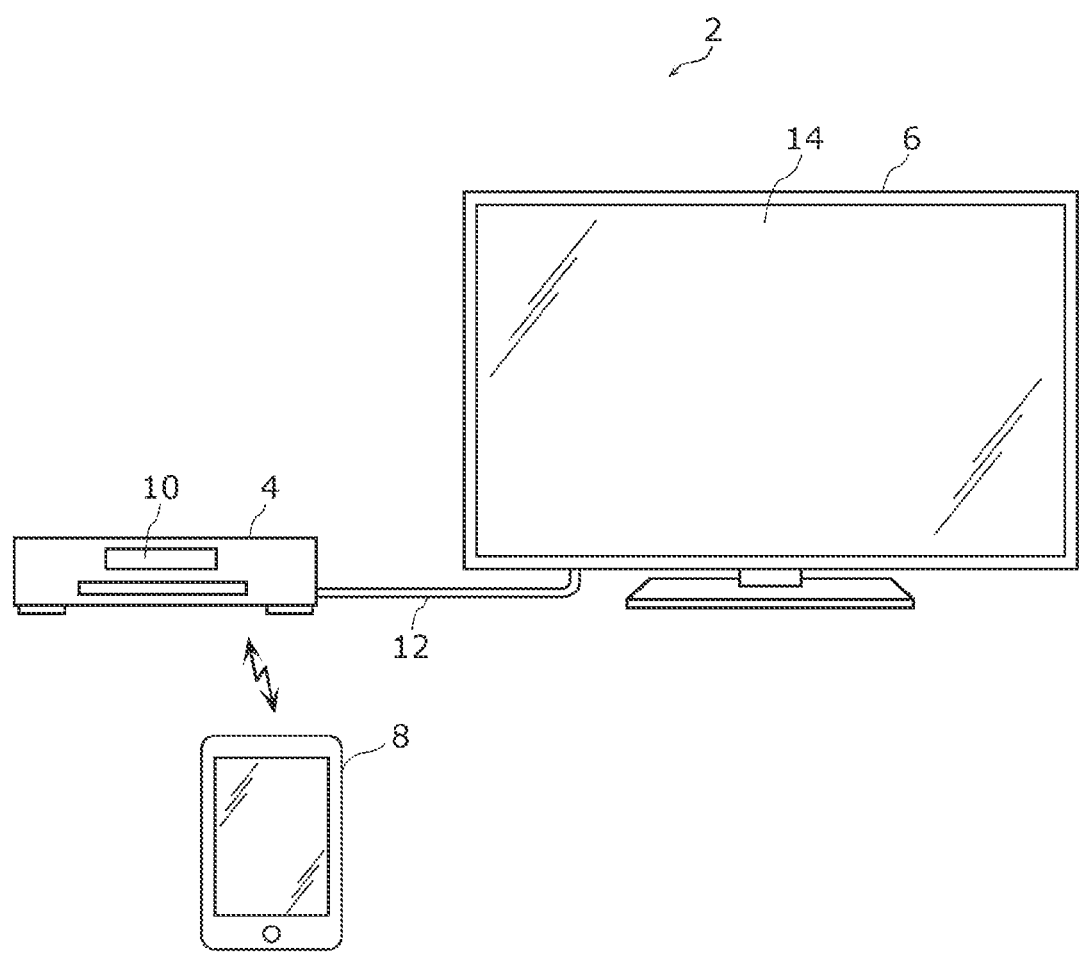
FIG. 1 is a conceptual diagram showing a system according to an embodiment.

With reference to FIG. 1, the following describes an overview of system 2 according to the embodiment. FIG. 1 is a conceptual diagram showing system 2 according to the embodiment.

As shown in FIG. 1, system 2 according to the embodiment includes reproduction device 4, display device 6, and terminal device 8.

Reproduction device 4 is, for example, a Blu-ray Disc (BD)/hard disc drive (HDD) recorder that reproduces video content recorded in an optical disc, such as a BD and a digital versatile disc (DVD), or an HDD, and records a broadcast program. Front panel display 10 for displaying various information is disposed at the front of reproduction device 4.

Display device 6 is, for example, a liquid crystal television receiver for viewing broadcast programs. Display device 6 is connected to reproduction device 4 via cable 12. Display device 6 includes display 14 for displaying, for example, video content reproduced by reproduction device 4. Note that cable 12 is a high-definition multimedia interface (HDMI)® cable.

Terminal device 8 is, for example, a mobile terminal such as a smartphone and a tablet terminal. Terminal device 8 is capable of wirelessly communicating with reproduction device 4. An application for performing initial settings for reproduction device 4 is installed in terminal device 8. As is described later, the user is able to perform the initial settings for reproduction device 4, using terminal device 8, even when display device 6 connected to reproduction device 4 is in the power-off state. Note that the initial settings are various settings (including network settings and tuner reception settings to be described later) that are performed at the first power on of reproduction device 4 after the purchase of reproduction device 4.

[1-2. Functional Configuration of System]

Figure 2:
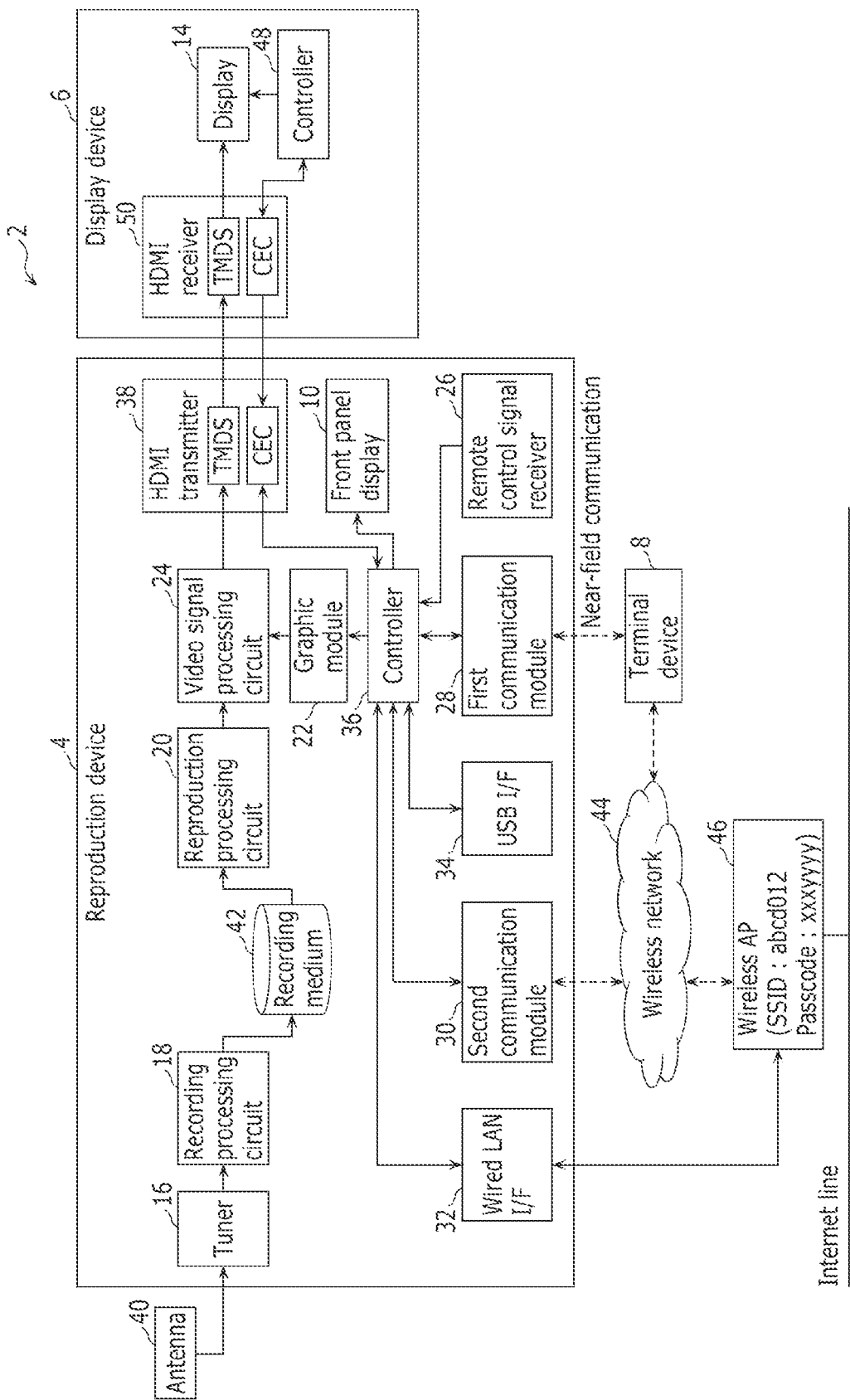
FIG. 2 is a block diagram showing the functional configuration of the system according to the embodiment.

With reference to FIG. 2, the following describes the functional configuration of system 2 according to the embodiment. FIG. 2 is a block diagram showing the functional configuration of system 2 according to the embodiment.

As shown in FIG. 2, the functional configuration of reproduction device 4 includes tuner 16, recording processing circuit 18, reproduction processing circuit 20, graphic module 22, video signal processing circuit 24, front panel display 10, remote control signal receiver 26 (an example of a receiver), first communication module 28 (an example of the first communicator), second communication module 30 (an example of a second communicator), wired local area network interface (LAN I/F) 32, universal serial bus interface (USB I/F) 34, controller 36 (an example of the controller), and HDMI transmitter 38 (an example of the detector).

Antenna 40 is disposed outside of reproduction device 4. Antenna 40 is connected to tuner 16, and receives broadcast waves (digital broadcast signal) transmitted from a broadcast station. Note that the broadcast waves include, for example, radio waves for broadcasting digital terrestrial broadcasts, digital broadcasting satellites (BS) broadcast, and digital communication satellites (CS) broadcasts.

Tuner 16 receives a broadcast program (digital broadcast program) included in the broadcast waves from antenna 40.

Recording processing circuit 18 performs processing for recording, onto recording medium 42, the broadcast program received by tuner 16. Note that recording medium 42 is, for example, an optical disc inserted inside of reproduction device 4, such as a BD and a DVD, or an HDD included in reproduction device 4.

Reproduction processing circuit 20 performs processing for reproducing video content, such as a broadcast program, recorded in recording medium 42.

Graphic module 22 generates various screens to be displayed on display device 6.

Video signal processing circuit 24 generates a video signal and an audio signal representing the video content reproduced by reproduction processing circuit 20, and outputs the generated video signal and audio signal to HDMI transmitter 38. Video signal processing circuit 24 also generates video signals representing various screens generated by graphic module 22, and outputs the generated video signals to HDMI transmitter 38.

Front panel display 10 is a liquid crystal display for displaying various information.

Remote control signal receiver 26 receives an instruction inputted by the user using a remote control (not illustrated) of reproduction device 4. Remote control signal receiver 26 receives a remote control signal from the remote control, and outputs the received remote control signal to controller 36.

First communication module 28 is a communication module for communicating with terminal device 8 by, for example, near-field communication such as Bluetooth® low energy (BLE).

Second communication module 30 is a communication module for wirelessly communicating with wireless network 44 (an example of a network). Wireless network 44 is, for example, a wireless LAN compliant with IEEE802.11 series of standards, and is 2.4 GHz or 5 GHz WiFi®. Wireless network 44 includes wireless access point (AP) 46 connected to the Internet line. Suppose here that the service set identifier (SSID) of wireless access point 46 is, for example, "abcd012", and the passcode is "xxxyyyy". Also suppose that wireless communication is established between terminal device 8 and wireless access point 46, and that terminal device 8 is connected to wireless network 44.

Wired LAN I/F 32 is a communication interface via which reproduction device 4 and wireless access point 46 are interconnected by wire. Wired LAN I/F 32 is connected to wireless access point 46 via a wired network that includes, for example, a wireless LAN which uses an Ethernet® cable.

USB I/F 34 is a communication interface via which reproduction device 4 and a USB device (not illustrated) are interconnected.

Controller 36 controls the operation of reproduction device 4, on the basis of the remote control signal from remote control signal receiver 26 and a control signal from HDMI transmitter 38 (to be described later). More specifically, controller 36 performs, for example, various processes for the initial settings for reproduction device 4. Controller 36 also controls displaying of various information on front panel display 10. Controller 36 also provides graphic module 22 with an instruction for generating various screens to be displayed on display device 6. Controller 36 also controls first communication module 28 and second communication module 30. Controller 36 also transmits and receives various data via wired LAN I/F 32 and USB I/F 34.

HDMI transmitter 38 is connected to HDMI receiver 50 of display device 6 via cable 12 (see FIG. 1). HDMI transmitter 38 transmits, to HDMI receiver 50 of display device 6, the video signal and the audio signal through transition-minimized differential signaling (TMDS) channels via cable 12. HDMI transmitter 38 transmits and receives a control signal (consumer electronics control (CEC) command) through the CEC channel via cable 12.

Note that the HDMI standards specify CEC for liking a plurality of HDMI devices with one another. CEC commands are bilaterally communicated between a plurality of HDMI devices in accordance with CEC. This communication is referred to as CEC communication. Through this CEC communication, HDMI transmitter 38 is able to detect, for example, the power state (power-on state or power-off state) of display device 6 connected to reproduction device 4.

Also, as shown in FIG. 2, display device 6 includes display 14, controller 48, and HDMI receiver 50.

Display 14 is a liquid crystal display panel for displaying, for example, various screens.

Controller 48 controls the operation of display device 6, on the basis of the control signal from HDMI receiver 50. Controller 48 also controls, for example, displaying of various screens on display 14.

HDMI receiver 50 receives the video signal and the audio signal from HDMI transmitter 38 of reproduction device 4 through the TMDS channels via cable 12. HDMI receiver 50 also transmits and receives the control signal to and from HDMI transmitter 38 of reproduction device 4 through the CEC channel via cable 12.

[1-3. Flow of Initial Settings for Reproduction Device]

Figure 3:
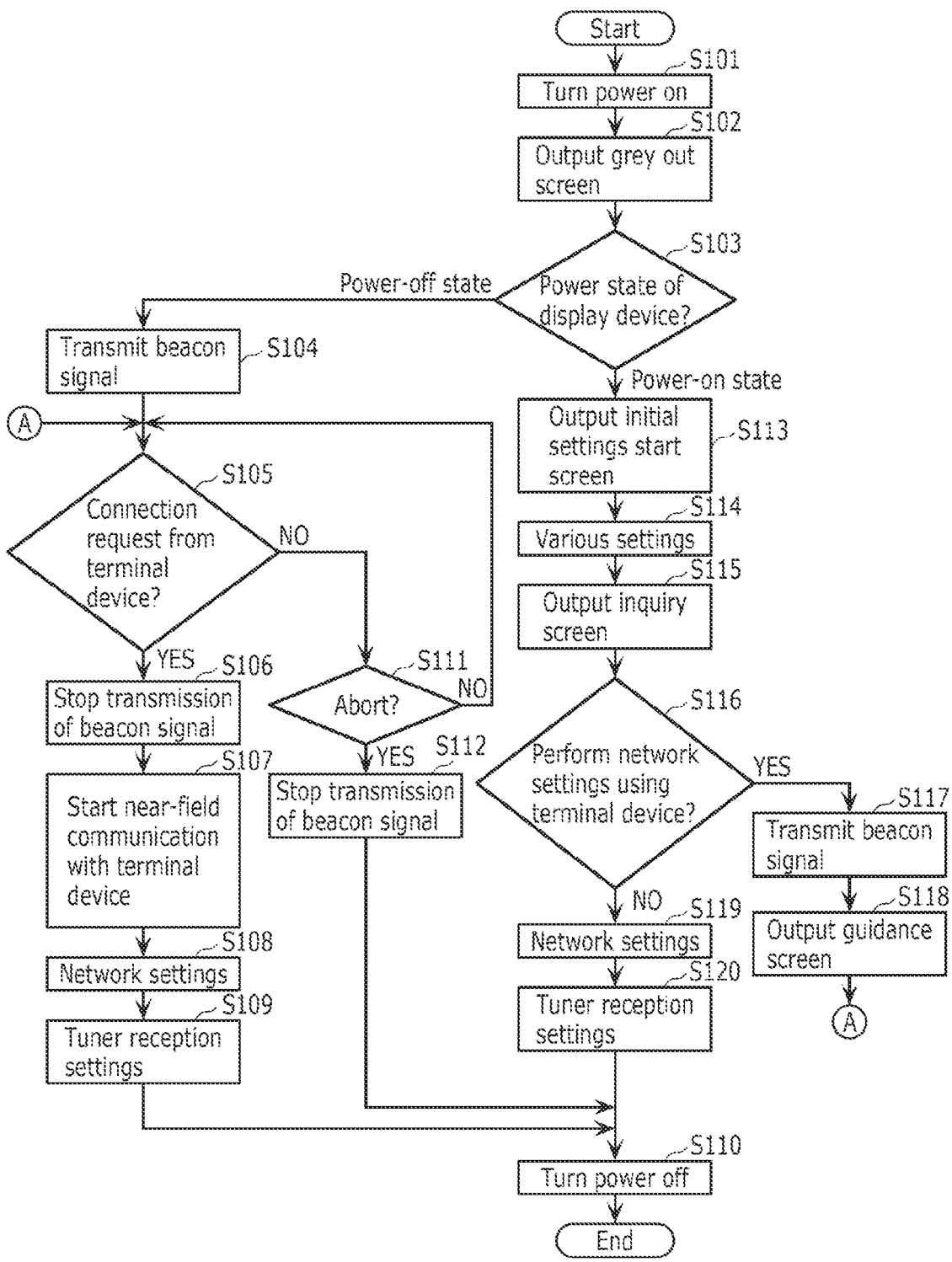
FIG. 3 is a flowchart showing the flow of initial settings for a reproduction device according to the embodiment.
Figure 4:
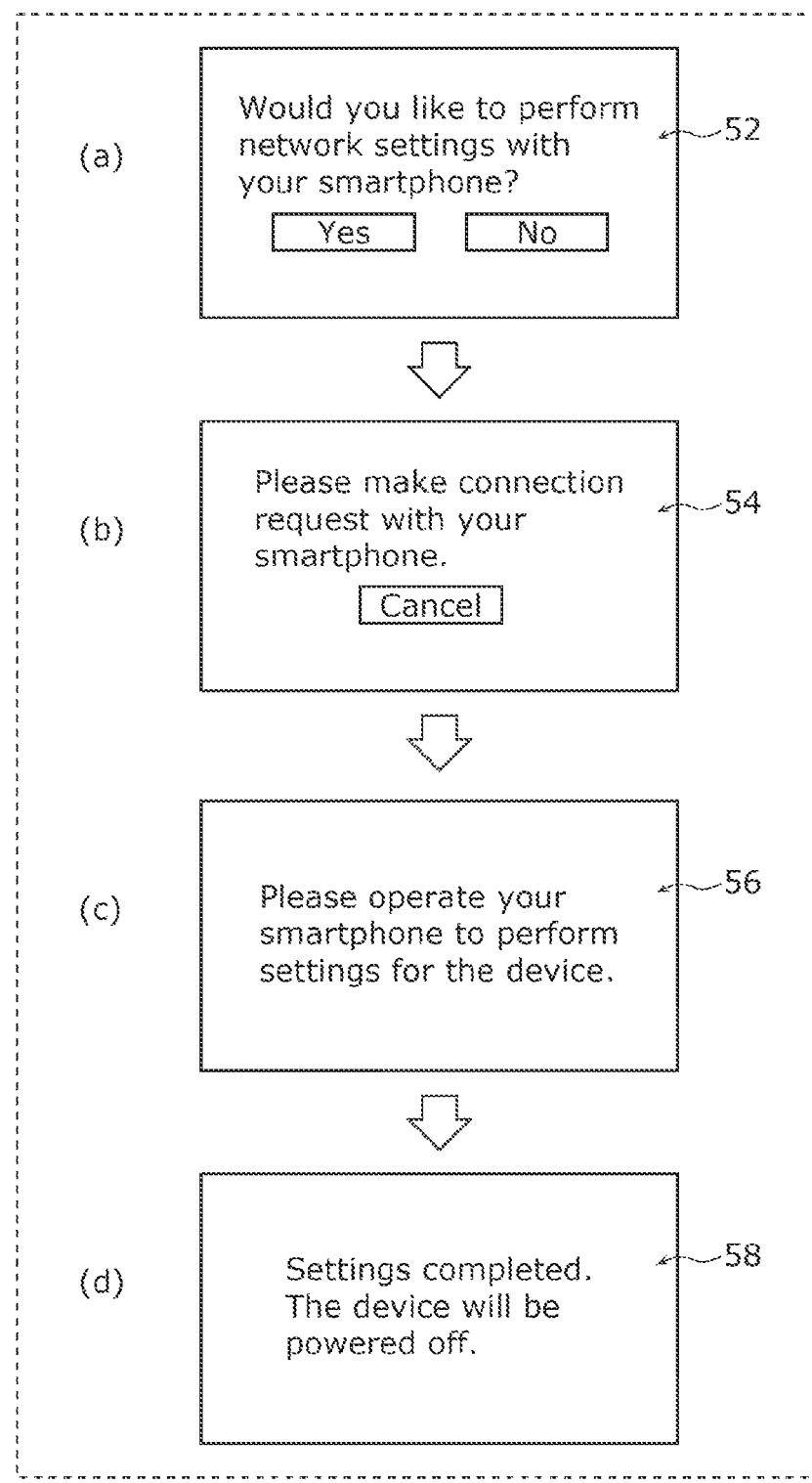
FIG. 4 is a diagram showing an example screen displayed on a display device according to the embodiment.

With reference to FIG. 3 and FIG. 4, the following describes the flow of the initial settings for reproduction device 4 according to the embodiment. FIG. 3 is a flowchart showing the flow of the initial settings for reproduction device 4 according to the embodiment. FIG. 4 is a diagram showing an example screen displayed on display device 6 according to the embodiment.

The following describes the case where the user connects reproduction device 4 and display device 6 via cable 12, and powers on reproduction device 4 for the first time after purchasing reproduction device 4.

As shown in FIG. 3, the user powers on reproduction device 4 (S101), in response to which reproduction device 4 outputs a grey out screen onto display device 6 (S102). This grey out screen is generated by graphic module 22, and outputted onto display device 6 by HDMI transmitter 38.

HDMI transmitter 38 detects the power state of display device 6, on the basis of the control signal from display device 6 (S103). When the power state of display device 6 is the power-off state (i.e., when HDMI transmitter 38 does not detect that display device 6 is in the power-on state) ("Power-off state" in S103"), first communication module 28 transmits a beacon signal using BLE (S104). Stated differently, BLE advertising starts, and first communication module 28 enters a state of waiting for a connection request from terminal device 8 (S105).

The beacon signal from first communication module 28 is received by terminal device 8 that is present near reproduction device 4. The following describes the case where terminal device 8 that has received the beacon signal performs an operation for transmitting a connection request to reproduction device 4. Through this, terminal device 8 that has received the beacon signal transmits a connection request to reproduction device 4.

When first communication module 28 receives the connection request from terminal device 8 that has received the beacon signal (YES in S105), first communication module 28 stops the transmission of the beacon signal (S106), and starts near-field communication using BLE with terminal device 8 that has received the beacon signal (S107). Stated differently, near-field communication is established between first communication module 28 and terminal device 8.

After that, controller 36 performs, with terminal device 8, network settings (an example of the first settings that are settings relating to reproduction device 4) that are the settings for connecting reproduction device 4 to wireless network 44 by second communication module 30 (S108). Through this, second communication module 30 establishes wireless communication with wireless access point 46, and reproduction device 4 is connected to wireless network 44.

After that, controller 36 performs, with terminal device 8, tuner reception settings (an example of second settings) that are settings relating to the settings for tuner 16 (S109). After the completion of the tuner reception settings, reproduction device 4 is powered off (S110).

Returning to step S105 described above, the following describes the case where the user performs an operation for aborting the transmission of the connection request to reproduction device 4, using terminal device 8 that has received the beacon signal (NO in S105, YES in S111). In this case, terminal device 8 that has received the beacon signal transmits an abort request to reproduction device 4. First communication module 28 receives the abort request from terminal device 8 that has received the beacon signal, thereby stopping the transmission of the beacon signal (S112). After that, reproduction device 4 is powered off (S110).

Note that when the user does not perform the operation for aborting the transmission of the connection request to reproduction device 4, using terminal device 8 that has received the beacon signal (NO in S111), the processing returns to step S105 described above.

Returning to step S103 described above, and when the power state of display device 6 is the power-on state ("Power-on state" in S103), reproduction device 4 outputs an initial settings start screen onto display device 6 (S113). Such initial settings start screen is generated by graphic module 22, and outputted onto display device 6 by HDMI transmitter 38. The user operates the remote control of reproduction device 4 to perform various settings for reproduction device 4 (S114). More specifically, the various settings for reproduction device 4 include, for example, (a) settings relating to the remote control of reproduction device 4, (b) settings relating to connections of display device 6, and (c) settings for checking whether display device 6 is 4K/60p-capable.

After the completion of the various settings for reproduction device 4, reproduction device 4 outputs inquiry screen 52 onto display device 6 (S115) that is a screen for inquiring whether the user performs the network settings using terminal device 8. Such inquiry screen 52 is generated by graphic module 22, and outputted onto display device 6 by HDMI transmitter 38. Through this, inquiry screen 52 as shown in (a) in FIG. 4, for example, is displayed on display 14 of display device 6. Displayed on inquiry screen 52 is, for example, a message saying "Would you like to perform network settings with your smartphone?", together with selectable "Yes" and "No" buttons.

When the user selects "Yes" button on inquiry screen 52, using the remote control of reproduction device 4, that is, when the user wishes to perform the network settings using terminal device 8 (YES in S116), first communication module 28 transmits a beacon signal using BLE (S117).

At this time, reproduction device 4 outputs guidance screen 54 onto display device 6 (S118) that is a screen for prompting the user to perform an operation on terminal device 8 (operation for transmitting a connection request to reproduction device 4). Such guidance screen 54 is generated by graphic module 22, and outputted onto display device 6 by HDMI transmitter 38. Through this, guidance screen 54 as shown in (b) in FIG. 4, for example, is displayed on display 14 of display device 6. Displayed on guidance screen 54 is, for example, a message saying "Please make connection request with your smartphone", together with a selectable "Cancel" button.

After that, BLE advertising starts, and first communication module 28 enters a state of waiting for a connection request from terminal device 8 (S105). Thereafter, the processes of steps S105 through S112 are performed as in the foregoing description. Note that when step S105 is followed by step S111, and the user performs an operation for selecting "Cancel" button on guidance screen 54 using the remote control of reproduction device 4, the processing proceeds to step S112.

Meanwhile, when step S105 is followed by step S106, reproduction device 4 outputs guidance screen 56 onto display device 6 that is a screen for prompting the user to perform the network settings and the tuner reception settings by operating terminal device 8. Such guidance screen 56 is generated by graphic module 22, and outputted onto display device 6 by HDMI transmitter 38. Through this, guidance screen 56 as shown in (c) in FIG. 4, for example, is displayed on display 14 of display device 6. Displayed on guidance screen 56 is, for example, a message saying "Please operate your smartphone to perform settings for the device".

Also, after step S109, reproduction device 4 outputs notification screen 58 onto display device 6 that is a screen for notifying the user of the completion of the initial settings. Such notification screen 58 is generated by graphic module 22, and outputted onto display device 6 by HDMI transmitter 38. Through this, notification screen 58 as shown in (d) in FIG. 4, for example, is displayed on display 14 of display device 6. Displayed on notification screen 58 is, for example, a message saying "Settings completed. The device will be powered off".

Returning to step S116 described above, and when the user performs an operation for selecting "No" button on inquiry screen 52, using the remote control of reproduction device 4, that is, when the user does not wish to perform the network settings using terminal device 8 (NO in S116), the user performs the network settings on the screen displayed on display device 6 by operating the remote control of reproduction device 4 (S119), and then performs the tuner reception settings (S120). After that, reproduction device 4 is powered off (S110).

[1-4. Flow of Network Settings]

Figure 5:
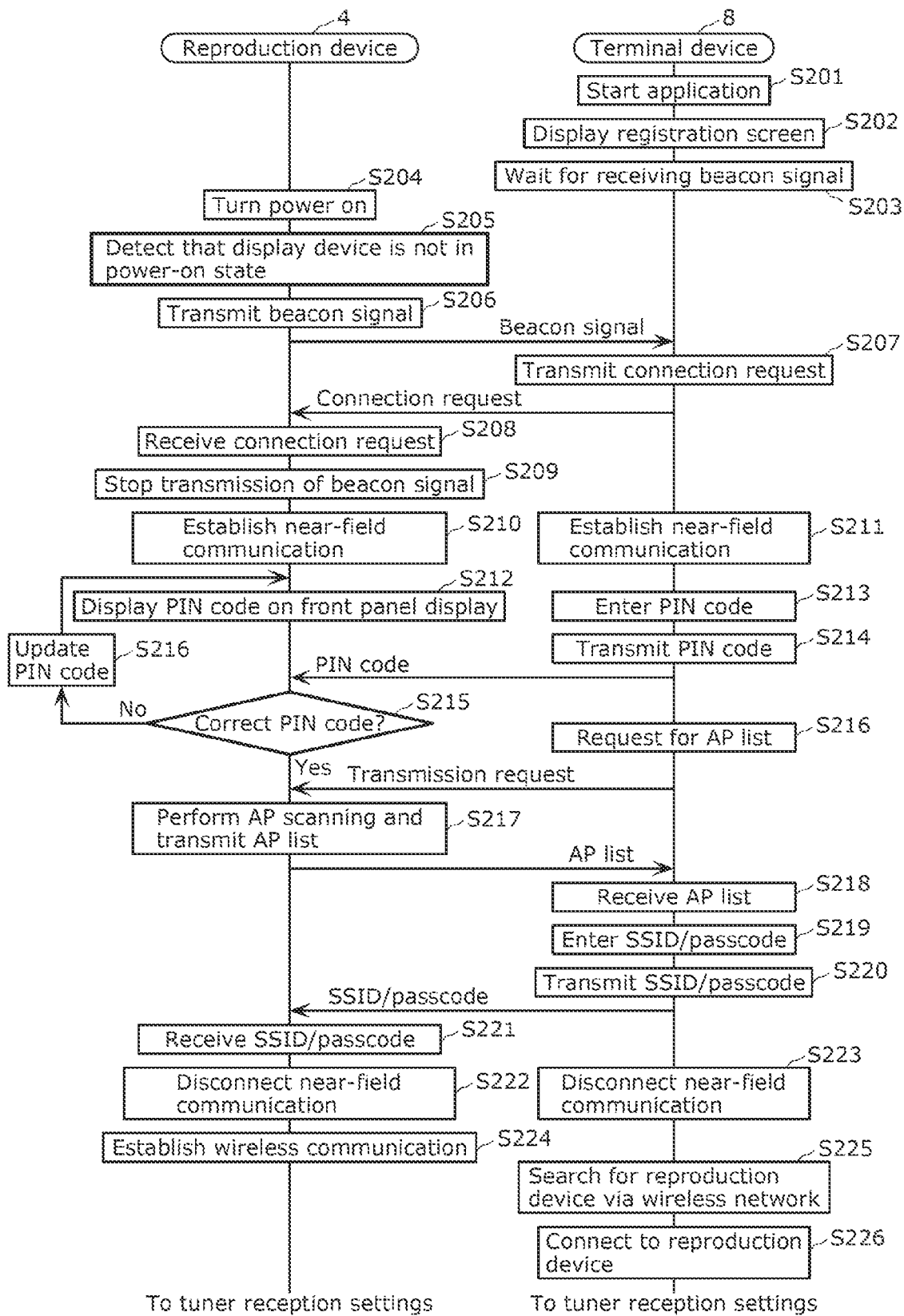
FIG. 5 is a sequence diagram showing the flow of network settings performed between the reproduction device and a terminal device according to the embodiment.
Figure 6:
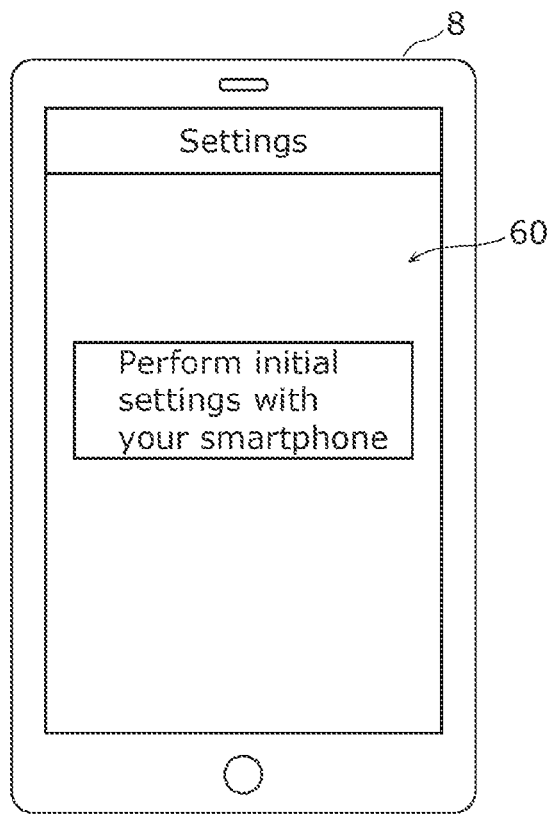
FIG. 6 is a diagram showing an example screen displayed on terminal device according to the embodiment.
Figure 7:
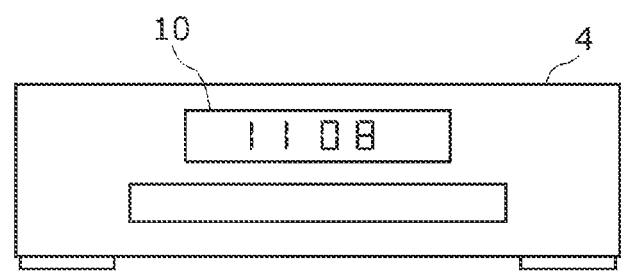
FIG. 7 is a diagram showing an example personal identification number code displayed on the reproduction device according to the embodiment.
Figure 8:
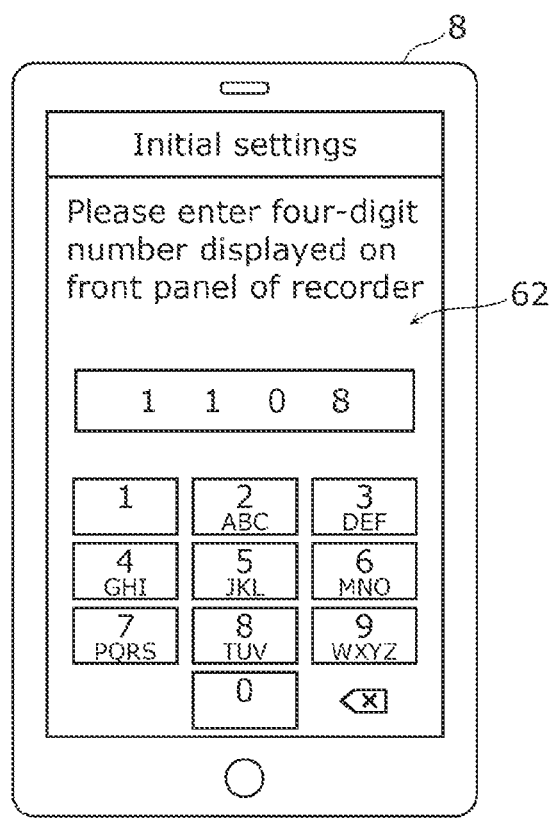
FIG. 8 is a diagram showing an example screen displayed on the terminal device according to the embodiment.
Figure 9:
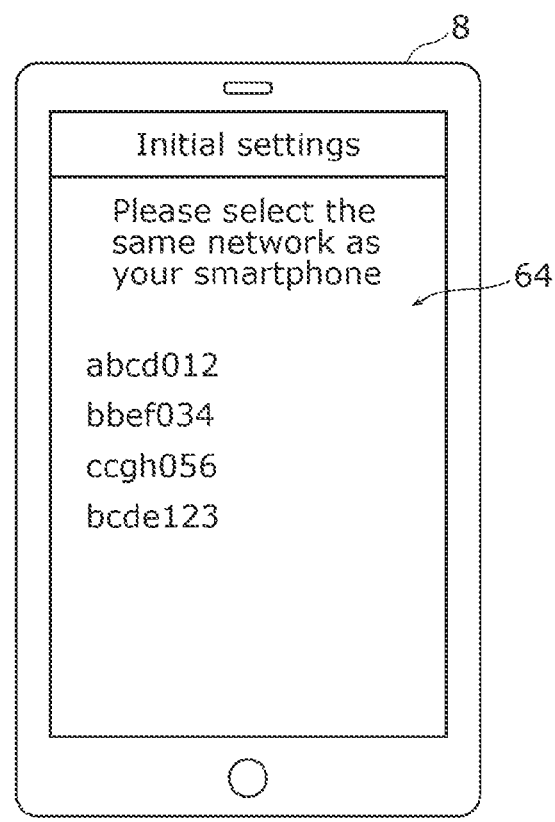
FIG. 9 is a diagram showing an example screen displayed on the terminal device according to the embodiment.
Figure 10:
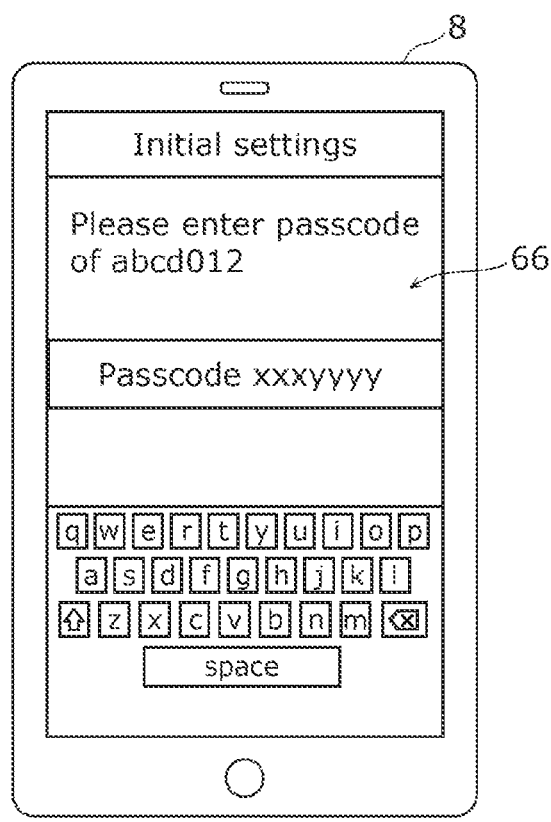
FIG. 10 is a diagram showing an example screen displayed on the terminal device according to the embodiment.

With reference to FIG. 5 through FIG. 10, the following specifically describes the flow of the network settings performed between reproduction device 4 and terminal device 8. FIG. 5 is a sequence diagram showing the flow of the network settings performed between reproduction device 4 and terminal device 8 according to the embodiment. FIG. 6 is a diagram showing an example screen displayed on terminal device 8 according to the embodiment. FIG. 7 is a diagram showing an example personal identification number (PIN) code displayed on reproduction device 4 according to the embodiment. FIG. 8 through FIG. 10 are diagrams, each showing an example screen displayed on terminal device 8 according to the embodiment.

The following describes the flow of the network settings to be performed when display device 6 connected to reproduction device 4 is in the power-off state.

First, as shown in FIG. 5, the user starts an application installed in terminal device 8 by operating terminal device 8 (S201). Through this, registration screen 60 is displayed on terminal device 8 as shown in FIG. 6 (S202). A selectable "Perform initial settings with smartphone" button is displayed on registration screen 60. The user taps "Perform initial settings with smartphone" button, in response to which terminal device 8 enters a state of waiting for receiving a beacon signal from reproduction device 4 (S203).

Also, the user powers on reproduction device 4 (S204). Reproduction device 4 detects that display device 6 is not in the power-on state, on the basis of the control signal from display device 6 (S205), and transmits a beacon signal using BLE (S206).

Terminal device 8 receives the beacon signal from reproduction device 4, and transmits a connection request to reproduction device 4 (S207). Note that when terminal device 8 fails to receive a beacon signal from reproduction device 4 after a predetermined time has elapsed, as a result of which a timeout occurs, a message is displayed, on terminal device 8, saying, for example, that "Connection failed. Please power off the recorder".

Reproduction device 4 receives the connection request from terminal device 8 that has received the beacon signal (S208), and stops the transmission of the beacon signal (S209). Through this, near-field communication using BLE is established between reproduction device 4 and terminal device 8 (S210, S211).

After that, reproduction device 4 displays the PIN code on front panel display 10 as shown in FIG. 7 (S212). The PIN code is, for example, a four-digit number such as "1108". At this time, PIN code entry screen 62 is displayed on terminal device 8 as shown in FIG. 8. Displayed on PIN code entry screen 62 is, for example, a message saying "Please enter four-digit number displayed on front panel of recorder", together with the PIN code entry field and the entry keys. The user enters the PIN code displayed on front panel display 10 of reproduction device 4 onto PIN code entry screen 62 (S213). In response to this, terminal device 8 transmits the entered PIN code to reproduction device 4 (S214).

Reproduction device 4 receives the PIN code transmitted from terminal device 8, and determines whether the received PIN code is correct (S215). When the PIN code is not correct (NO in S215), reproduction device 4 updates the PIN code (S216), and displays an updated new PIN code onto front panel display 10 (S212). Note that reproduction device 4 forcefully turns the power off when a total of three incorrect PIN codes are received.

The following describes the case where reproduction device 4 receives the correct PIN code (YES in S215). Terminal device 8 requests reproduction device 4 for the transmission of an access point (AP) list (S216). In response to this, reproduction device 4 performs AP scanning to create an AP list, and transmits the created AP list to terminal device 8 (S217).

Terminal device 8 receives the AP list from reproduction device 4 (S218). At this time, AP list screen 64 is displayed on terminal device 8 on the basis of the received AP list as shown in FIG. 9. Displayed on AP list screen 64 is, for example, a message saying "Please select the same network as your smartphone", together with the SSIDs of the wireless access points detected by AP scanning, "abcd012", "bbef034", "ccgh056", and "bcde123".

On AP list screen 64, the user selects the SSID "abcd012" of wireless access point 46 with which wireless communication is established with terminal device 8 (S219). In response to this, passcode entry screen 66 is displayed on terminal device 8 as shown in FIG. 10. Displayed on passcode entry screen 66 is, for example, a message saying "Please enter passcode of abcd012", together with the passcode entry field and the numeric keypad. The user enters the passcode "xxxyyyy" of the SSID "abcd012" onto passcode entry screen 66 (S219). In response to this, terminal device 8 transmits, to reproduction device 4, the SSID and the passcode entered by the user (S220).

Reproduction device 4 receives the SSID and the passcode transmitted from terminal device 8 (S221). In response to this, the near-field communication between reproduction device 4 and terminal device 8 is disconnected (S222, S223), and reproduction device 4 establishes wireless communication with wireless access point 46, on the basis of the received SSID and passcode (S224) to start the connection with wireless network 44.

After this, terminal device 8 searches for reproduction device 4 via wireless network 44 (S225), and connects to reproduction device 4 via wireless network 44 (S226). After this, the tuner reception settings is performed between reproduction device 4 and terminal de vice 8 in a manner to be described below.

[1-5. Flow of Tuner Reception Settings]

Figure 11:
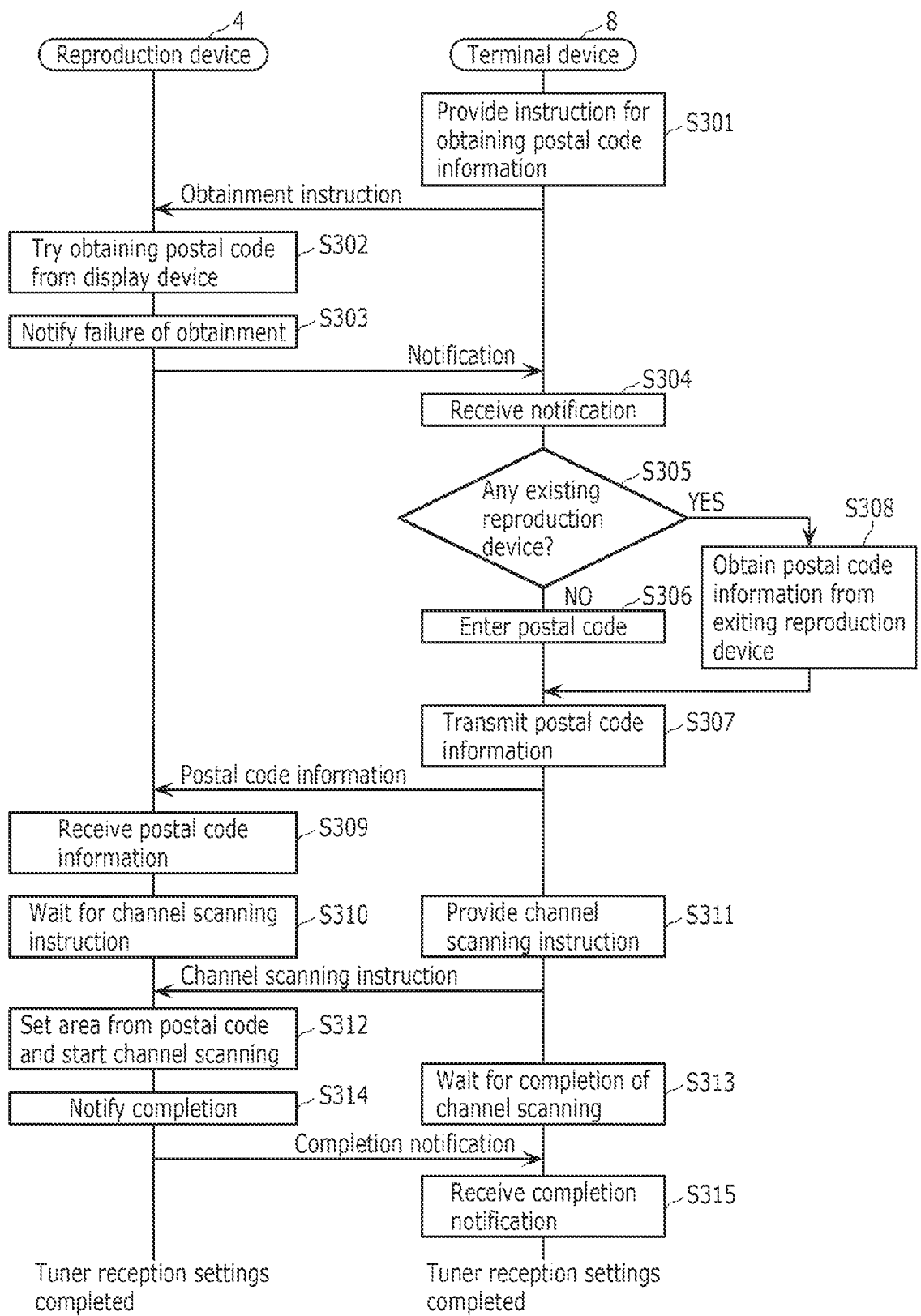
FIG. 11 is a sequence diagram showing the flow of tuner reception settings performed between the reproduction device and the terminal device according to the embodiment.
Figure 12:
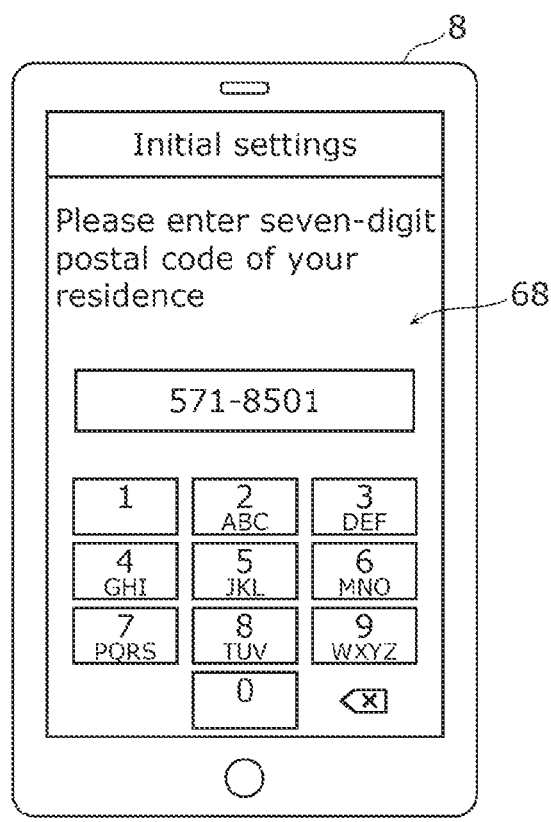
FIG. 12 is a diagram showing an example screen displayed on the terminal device according to the embodiment.
Figure 13:
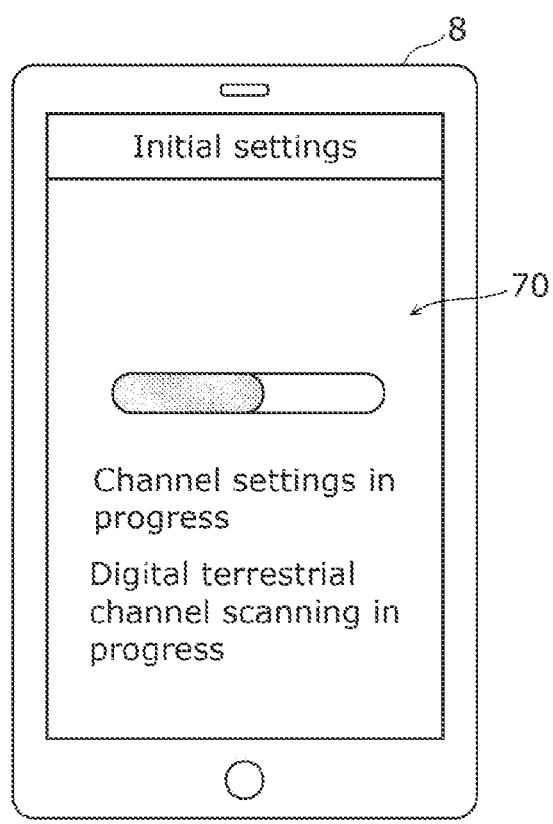
FIG. 13 is a diagram showing an example screen displayed on the terminal device according to the embodiment.

With reference to FIG. 11 through FIG. 13, the following specifically describes the flow of the tuner reception settings performed between reproduction device 4 and terminal device 8. FIG. 11 is a sequence diagram showing the flow of the tuner reception settings performed between reproduction device 4 and terminal device 8 according to the embodiment. FIG. 12 and FIG. 13 are diagrams, each showing an example screen displayed on terminal device 8 according to the embodiment.

When reproduction device 4 has been able to obtain, from display device 6, postal code information that is required to perform the tuner reception settings, reproduction device 4 performs the tuner reception settings on the basis of the postal code information obtained from display device 6. The following describes the case where reproduction device 4 fails to obtain postal code information from display device 6. The postal code information is information indicating a postal code of the area where reproduction device 4 is located.

As shown in FIG. 11, terminal device 8 provides reproduction device 4, via wireless network 44, with an instruction for obtaining the postal code information (S301). Reproduction device 4 tries obtaining the postal code information from display device 6 by CEC (S302), and notifies, via wireless network 44, terminal device 8 of the failure of obtaining the postal code information (S303).

Terminal device 8 receives the notification from reproduction device 4 (S304), and determines whether other existing reproduction devices (not illustrated) are present for which tuner reception settings have been completed (S305). When no existing reproduction device is present (NO in S305), postal code entry screen 68 is displayed on terminal device 8 as shown in FIG. 12. Displayed on postal code entry screen 68 is, for example, a message saying "Please enter seven-digit postal code of your residence", together with the postal code entry field and the entry keys. The user enters the postal code of his/her residential area onto postal code entry screen 68, such as, for example, "571-8501" (S306). In response to this, terminal device 8 transmits, to reproduction device 4, the postal code information indicating the postal code entered by the user (S307).

Returning to step S305 described above, and when an existing reproduction device is present (YES in S305), terminal device 8 obtains postal code information from the existing reproduction device via wireless network 44 (S308). In response to this, terminal device 8 transmits, to reproduction device 4, the postal code information indicating the postal code obtained from the existing reproduction device (S307).

Reproduction device 4 receives the postal code information transmitted from terminal device 8 (S309), and enters a state of waiting for channel scanning instruction (S310).

Terminal device 8 provides reproduction device 4, via wireless network 44, with a channel scanning instruction (S311), in response to which reproduction device 4 performs the area settings from the received postal code information, and starts channel scanning (S312). In response to this, terminal device 8 enters a state of waiting for the completion of channel scanning (S313). At this time, standby screen 70 is displayed on terminal device 8 that is a screen indicating that the completion of channel scanning is waited as shown in FIG. 13. Displayed on standby screen 70 is, for example, a message saying "Channel settings in progress Digital terrestrial channel scanning in progress", together with the progress bar showing the progress of the channel scanning.

When the channel scanning is completed, reproduction device 4 transmits, via wireless network 44, a completion notification to terminal device 8 (S314) that notifies the completion of the channel scanning. Terminal device 8 receives the completion notification transmitted from reproduction device 4 (S315). The tuner reception settings are completed as in the foregoing manner.

[1-6. Effects]

As described above, reproduction device 4 in the present embodiment is a reproduction device that is connectable to display device 6 and outputs a video signal to display device 6. Reproduction device 4 includes: HDMI transmitter 38 that detects a power state of display device 6; first communication module 28 that establishes communication with terminal device 8 that is externally located, when HDMI transmitter 38 does not detect that display device 6 is in a power-on state; and controller 36 that performs first settings with terminal device 8, when the communication is established between terminal device 8 and first communication module 28, the first settings being settings relating to reproduction device 4.

With this, it is possible to perform the first settings between terminal device 8 and reproduction device 4 by establishing communication between terminal device 8 and first communication module 28, when HDMI transmitter 38 does not detect that display device 6 is in the power-on state. This enables the first settings to be performed without using display device 6, thereby increasing the user convenience.

Also, in the present embodiment, first communication module 28 transmits a beacon signal to terminal device 8 and establishes the communication with terminal device 8 that has received the beacon signal, when HDMI transmitter 38 does not detect that display device 6 is in the power-on state.

With this, it is possible to easily establish communication between terminal device 8 and first communication module 28, using a beacon signal.

Also, reproduction device 4 in the present embodiment further includes remote control signal receiver 26 that receives an instruction from a user. First communication module 28 transmits the beacon signal to terminal device 8 and establishes the communication with terminal device 8 that has received the beacon signal, when HDMI transmitter 38 detects that display device 6 is in the power-on state and remote control signal receiver 26 receives, from the user, the instruction indicating that the first settings are to be performed using terminal device 8.

With this, it is possible to establish communication between terminal device 8 and first communication module 28, when the user wishes to perform the first settings using terminal device 8, even in the case where HDMI transmitter 38 detects that display device 6 is in the power-on state.

Also, reproduction device 4 in the present embodiment further includes second communication module 30 that communicates with wireless network 44. The first settings are settings for connecting reproduction device 4 to wireless network 44 by second communication module 30.

With this, it is possible to use terminal device 8 to perform the first settings for connecting reproduction device 4 to wireless network 44 by second communication module 30.

Also, in the present embodiment, wireless network 44 is a wireless LAN. First communication module 28 receives the SSID of wireless access point 46 of the wireless LAN from terminal device 8 to which the user has entered the SSID. Controller 36 performs the first settings, based on the SSID received by first communication module 28.

With this, it is possible to perform the first settings, on the basis of the SSID entered by the user to terminal device 8.

Also, reproduction device 4 in the present embodiment further includes tuner 16 that receives broadcast waves. Second communication module 30 establishes communication with terminal device 8 via wireless network 44, when reproduction device 4 is connected to wireless network 44. When controller 36 has obtained, form display device 6, postal code information indicating a postal code of an area where reproduction device 4 is located, controller 36 performs second settings relating to settings for tuner 16, based on the postal code information obtained. When controller 36 fails to obtain the postal code information from display device 6, second communication module 30 provides an instruction to terminal device 8 via wireless network 44, the instruction being an instruction for obtaining the postal code information from another reproduction device for which the second settings have been completed.

With this, it is possible for terminal device 8 to obtain postal code information from another reproduction device for which the second settings have been completed, even when controller 36 fails to obtain the postal code information from display device 6.

Also, in the present embodiment, the reproduction device control method is a control method of controlling reproduction device 4 that is connectable to display device 6 and outputs a video signal to display device 6. The reproduction device control method includes: detecting a power state of display device 6; establishing communication with terminal device 8 that is externally located, when display device 6 is not detected to be in a power-on state; and performing first settings between terminal device 8 and reproduction device 4, when the communication is established between terminal device 8 and reproduction device 4.

With this, it is possible to perform the first settings without using display device 6, thereby increasing the user convenience as described above.

Also, in the present embodiment, the program causes a computer to perform the foregoing reproduction device control method of controlling reproduction device 4.

[1-7. Variation]

Figure 14:
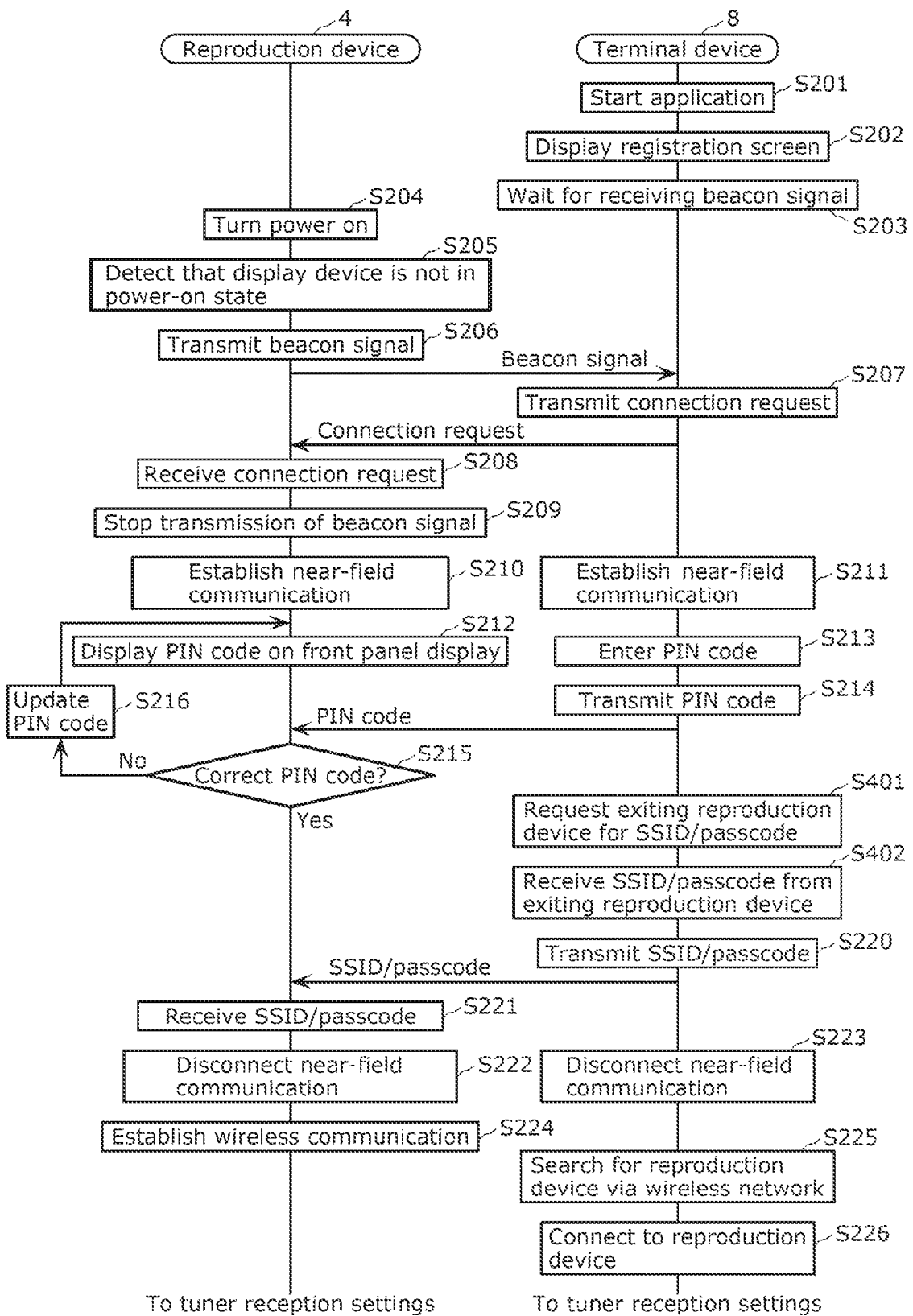
FIG. 14 is a sequence diagram showing the flow of network settings to be performed between the reproduction device and the terminal device according to a variation of the embodiment.

With reference to FIG. 14, the following describes the flow of network settings performed between reproduction device 4 and terminal device 8 according to a variation of the embodiment. FIG. 14 is a sequence diagram showing the flow of the network settings performed between reproduction device 4 and terminal device 8 according to the variation of the embodiment.

As shown in FIG. 14, steps S216 through S219 that are described with reference to FIG. 5 are replaced by steps S401 and S402 in the present variation.

When step S215 is Yes, terminal device 8 requests, via wireless network 44, another existing reproduction device (not illustrated) for which network settings have been performed for the SSID and the passcode (S401), and receives the SSID and the passcode from such existing reproduction device (S402). After that, terminal device 8 transmits, to reproduction device 4, the SSID and the passcode received from the existing reproduction device (S220).

In the present variation, wireless network 44 is a wireless LAN. First communication module 28 receives, from terminal device 8, the SSID of wireless access point 46 of the wireless LAN obtained by terminal device 8 from the other reproduction device for which first settings have been completed. Controller 36 performs the first settings, on the basis of the SSID received by first communication module 28.

This enables the first settings to be performed on the basis of the SSID obtained by terminal device 8 from the other reproduction device for which the first settings have been completed. This eliminates the necessity of the user having to enter the SSID and the passcode, thereby increasing the user convenience.

[Variation and Others]

The embodiment has been described above to illustrate the technology disclosed in the present application. However, the technology of the present discourse is not limited to the embodiment and thus also applicable to the embodiment to which modification, replacement, addition, omission, and so forth are applied where necessary. Also, elements described in the foregoing embodiment can be combined to serve as a new embodiment.

In view of the above, other embodiments will be described below.

In the foregoing embodiment, HDMI transmitter 38 detects the power state of display device 6. When HDMI transmitter 38 detects that display device 6 is in the power-off state, however, display device 6 does not necessarily have to be connected to reproduction device 4. Stated differently, HDMI transmitter 38 cannot detect that display device 6 is in the power-on state, when display device 6 is not connected to reproduction device 4. In this case, reproduction device 4 performs processing in accordance with the following algorithm: (i) check the state of HDMI connection with HDMI receiver 50, and the power-on state of display device 6; (ii) transfer an input to display device 6 to reproduction device 4 by a CEC command; (iii) determine whether the input is transferred to reproduction device 4 by a CEC command; and (iv) determine whether display device 6 is in active source state by a CEC command.

Also, in the foregoing embodiment, reproduction device 4 is wirelessly connected to wireless access point 46 by second communication module 30, but the present disclosure is not limited to this. Reproduction device 4 may thus be connected to wireless access point 46 by wire via wired LAN I/F 32. In this case, immediately before step S216 in the flowchart of FIG. 5, an inquiry screen may be displayed on terminal device 8 that is a screen for inquiring whether the user wishes to connect to wireless access point 46 by a wireless LAN or by a wired LAN. When the user selects the connection by a wireless LAN, controller 36 invalidates wired LAN I/F 32 and validates second communication module 30. In this case, the processes of step S217 and after in the flowchart of FIG. 5 are performed as in the foregoing description. Meanwhile, when the user selects the connection by a wired LAN, controller 36 validates wired LAN I/F 32 and invalidates second communication module 30. In this case, the processes of step S217 and after in the flowchart of FIG. 5 will not be performed, and a wired connection is established between reproduction device 4 and wireless access point 46. The near-field connection between reproduction device 4 and terminal device 8 is thus disconnected.

Also, in the foregoing embodiment, near-field communication using BLE is established between reproduction device 4 and terminal device 8, but USB communication may be established between reproduction device 4 and terminal device 8 instead. In this case, terminal device 8 is connected to USB I/F 34 via a USB cable, which eliminates the necessity of the foregoing authentication processing that uses a PIN code.

In the foregoing embodiment, near-field communication using BLE is established between reproduction device 4 and terminal device 8. Instead of this, however, reproduction device 4 may be set to parent device mode (AP mode) to directly communicate with terminal device 8 (ad hoc communication) to set information about wireless access point 46 from terminal device 8. After that, the settings of reproduction device 4 may be changed to slave device mode to connect to wireless access point 46 by infrastructure communication.

Each of the elements in the foregoing embodiment may be configured in the form of an exclusive hardware product, or may be realized by executing a software program suitable for the element. Each of the elements may be realized by means of a program executing unit, such as a CPU and a processor, reading and executing the software program recorded on a non-transitory recording medium such as a hard disk or a semiconductor memory.

Also, some or all of the functions of reproduction device 4 according to the foregoing embodiment may be realized by a processor, such as a CPU, executing the program.

The embodiment has been described above to illustrate the technology of the present disclosure, for which the accompanying drawings and detailed description have been provided.

To illustrate the above technology, the elements described in the accompanying drawings and detailed description can thus include not only the elements essential to solve the problem, but also elements not essential to solve the problem. Therefore, the fact that such non-essential elements are illustrated in the accompanying drawings and detailed description should not lead to the immediate conclusion that such elements are essential.

Also note that the foregoing embodiment is intended for illustrating the technology of the present disclosure, and thus allows for various modifications, replacements, additions, omissions, and so forth made thereto within the scope of the claims and its equivalent scope.

INDUSTRIAL APPLICABILITY

The reproduction device in the present disclosure is applicable for use as, for example, a BD recorder that is connected to a television receiver via a cable.

The invention claimed is:

1. A reproduction device that is connectable to a display device and outputs a video signal to the display device, the reproduction device comprising:
    a detector configured to detect a power state of the display device;
    a first communicator configured to establish communication with a terminal device that is externally located;
    a receiver configured to receive an instruction from a user; and
    a controller configured to perform first settings with the terminal device, the first settings being settings relating to the reproduction device,
    wherein the controller is configured to perform the first settings with the terminal device,
    (a) after the communication is established by the first communicator between the terminal device and the first communicator without user instruction when the detector does not detect that the display device is in the power-on state, and
    (b) after the communication is established by the first communicator between the terminal device and the first communicator in response to (i) when the detector detects that the display device is in the power-on state, and (ii) when the receiver receives the user instruction indicating that the first settings are to be performed using the terminal device.

2. The reproduction device according to claim 1, wherein:
    in case of (a), the first communicator transmits a beacon signal, without user instruction, to the terminal device and establishes the communication with the terminal device that has received the beacon signal, when the detector does not detect that the display device is in the power-on state, and
    in case of (b), after the receiver receives the user instruction indicating that the first settings are to be performed using the terminal device, the first communicator transmits the beacon signal to the terminal device and establishes the communication with the terminal device that has received the beacon signal.

3. The reproduction device according to claim 1, further comprising:
    a second communicator that communicates with a network,
    wherein the first settings are settings for connecting the reproduction device to the network by the second communicator.

4. The reproduction device according to claim 3,
    wherein the network is a wireless local area network (LAN),
    the first communicator receives a service set identifier (SSID) of an access point of the wireless LAN from the terminal device to which a user has entered the SSID, and
    the controller performs the first settings, based on the SSID received by the first communicator.

5. The reproduction device according to claim 3,
    wherein the network is a wireless LAN,
    the first communicator receives an SSID of a wireless access point of the wireless LAN from the terminal device that has obtained the SSID from another reproduction device for which the first settings have been completed, and
    the controller performs the first settings, based on the SSID received by the first communicator.

6. The reproduction device according to claim 3, further comprising:
    a tuner that receives broadcast waves,
    wherein the second communicator establishes communication with the terminal device via the network, when the reproduction device is connected to the network,
    when the controller has obtained, from the display device, postal code information indicating a postal code of an area where the reproduction device is located, the controller performs second settings relating to settings for the tuner, based on the postal code information obtained, and
    when the controller fails to obtain the postal code information from the display device, the second communicator provides an instruction to the terminal device via the network, the instruction being an instruction for obtaining the postal code information from another reproduction device for which the second settings have been completed.

7. A reproduction device control method of controlling a reproduction device that is connectable to a display device and outputs a video signal to the display device, the reproduction device control method comprising:
- detecting a power state of the display device;
- establishing communication with a terminal device that is externally located;
- receiving an instruction from a user; and
- performing first settings with the terminal device, the first settings being settings relating to the reproduction device after;
- (a) the communication is established between the terminal device and a communicator without user instruction in response to not detecting that the display device is in a power-on state, and
- (b) the communication is established between the terminal device and the communicator in response to (i) when detecting that the display device is in the power-on state, and (ii) when receiving the user instruction indicating that the first settings are to be performed using the terminal device.

8. A non-transitory computer-readable recording medium having recorded thereon a computer program for causing a computer to execute the reproduction device control method according to claim 7.

9. A reproduction device that is connectable to a display device and outputs a video signal to the display device, the reproduction device comprising:
- a tuner that receives broadcast waves,
- a detector that detects a power state of the display device;
- a communicator that establishes communication with a terminal device that is externally located, when the detector does not detect that the display device is in a power-on state; and
- a controller that, after the communication is established between the terminal device and the communicator, when the controller has obtained postal code information indicating a postal code of an area where the reproduction device is located, the controller performs settings relating to settings for the tuner, based on the postal code information obtained,
- wherein, when the controller fails to obtain the postal code information, the communicator provides an instruction to the terminal device, the instruction being an instruction for obtaining the postal code information from another reproduction device for which the settings relating to settings for the tuner have been completed.

* * * * *